United States Patent
O'Neill (10) Patent No.: US 7,611,118 B2
(45) Date of Patent: Nov. 3, 2009

(54) VERTICAL FLAT PANEL SECURITY MOUNTING DEVICE

(75) Inventor: Edward L. O'Neill, Oakland, CA (US)

(73) Assignee: Lucasey Manufacturing Co.,, Oakland, CA (US)

( * ) Notice: Subject to any disclaimer, the term of this patent is extended or adjusted under 35 U.S.C. 154(b) by 414 days.

(21) Appl. No.: 11/351,203

(22) Filed: Feb. 9, 2006

(65) Prior Publication Data

US 2007/0181772 A1   Aug. 9, 2007

(51) Int. Cl.
  *F16M 1/00*   (2006.01)
(52) U.S. Cl. ..................... 248/551; 248/917
(58) Field of Classification Search .......... 248/551, 248/553, 917; 70/58, 232, 451, DIG. 57
  See application file for complete search history.

(56) References Cited

U.S. PATENT DOCUMENTS

| | | | | |
|---|---|---|---|---|
| 4,973,023 A | * | 11/1990 | O'Neill | 248/551 |
| 5,383,641 A | * | 1/1995 | Bergetz | 248/425 |
| 6,216,989 B1 | * | 4/2001 | Shioya et al. | 248/122.1 |
| 6,229,584 B1 | * | 5/2001 | Chuo et al. | 349/58 |
| 7,159,828 B1 | * | 1/2007 | Yau et al. | 248/125.8 |
| 7,267,312 B2 | * | 9/2007 | Kang et al. | 248/291.1 |
| 7,273,203 B2 | * | 9/2007 | Carnevali | 248/553 |
| 7,274,557 B2 | * | 9/2007 | North et al. | 361/681 |

* cited by examiner

*Primary Examiner*—Gwendolyn Baxter
(74) *Attorney, Agent, or Firm*—Niro, Scavone, Haller & Niro (57) ABSTRACT

A low profile security mounting apparatus for mounting a flat panel screen to a support surface. The apparatus generally comprises a mounting plate, a back cover, and a platform. The mounting plate comprises an array of apertures for mounting a flat panel screen, a base for attachment to the platform, and a receptacle for engagement with the back cover. The back cover further comprises a panel that conceals the appliance mounting hardware, and a lower securing element that attaches to the platform. The platform in the present invention comprises a lower housing that is used as a locking mechanism for rotationally securing the apparatus. The platform also comprises an upper housing that uses a plurality of fasteners to secure the mounting plate and back cover.

4 Claims, 8 Drawing Sheets

VERTICAL FLAT PANEL SECURITY MOUNTING DEVICE

BACKGROUND OF THE INVENTION

The present invention relates generally to the field of equipment security devices. More particularly, the present invention relates to a low profile equipment security device used in an assembly for mounting flat panel video screens.

Equipment security devices are useful in preventing the theft of portable items, such as television sets, remote controls, and computer monitors. Conventional security devices consisted of metal holders that were attached to a fixed base by a cylinder lock. Such devices were bulky and required a traditional machined key. Additionally, the security measures on such devices were clearly visible and aesthetically unpleasing. Therefore, these security devices were impractical for use in places such as high class hotels, where guests may not appreciate the visibility of security measures on various items.

To address the limitations of traditional security devices, low profile security devices were developed. Such devices are disclosed in U.S. Pat. No. 4,973,023 and incorporated herein by reference. Low profile security devices generally consist of an upper housing for securing a desired appliance, and a lower housing with a locking means for rotationally fastening the upper housing to a desired surface. In assembled form, low profile security devices are aesthetically pleasing and rotationally free structures. The security measures on these devices are not clearly visible or accessible.

The upper housing in low profile security devices consists of a top surface with a plurality of holes, and a bottom surface with a stud. The lower housing consists of a box with a locking means, such as a metal object with substantial spring force. The locking means is accessible through an aperture on top of the lower housing that consists of a wide portion and a narrow portion. For assembly, a desired appliance is first mounted and immobilized onto the surface of the upper housing by using screws. The lower housing is then immobilized onto a desired surface. Next, the stud head on the upper housing is pressed firmly onto the locking means through the wide area. This makes the narrower area accessible. The stud head is then slid into the narrower area of the aperture, and the pressure is released to rotationally fasten the stud in the locking means.

The lower housing in low profile security devices also contains a second aperture that provides access to a ledge on the locking means for detaching the upper housing. For detachment, a bar is inserted into the second aperture and aligned with the ledge on the locking means. The bar is then rotated or pressed downward. This lowers the locking means and as a result releases the stud. The upper housing may then be pulled out from the lower housing.

Low profile security devices have addressed many of the unmet needs in the field of equipment security devices. However, security issues have once again come to the force with the advent of flat panel video screens. Flat panel screens are steadily replacing television and computer monitors in schools, libraries and hotel rooms. These screens cost significantly more than the traditional monitors. Additionally, flat panel screens are much easier to steal because of their light weight and compact structure. Unfortunately, flat panel screens cannot be mounted directly onto the upper housing of low profile security devices because of their narrow base structure. Though flat panel screens are usually mounted onto a stand, these stands cannot attach to the upper housing of low profile security devices in a secure and aesthetically pleasing manner. Thus, there is currently an unmet need in improving low profile security devices to accommodate flat panel screens. The present invention addresses this unmet and unanticipated need.

SUMMARY OF THE INVENTION

The present invention is directed to the improvement of low profile security devices so that they can serve as a security mounting apparatus for video display appliances.

The security mounting apparatus of the present invention generally comprises a mounting plate, a back cover, a platform, and a plurality of fasteners. The mounting plate of the present invention further comprises an array of apertures to receive hardware for mounting a video display appliance to its surface. In addition, the mounting plate of the present invention comprises a base and a receptacle. The receptacle is capable of engaging with the back cover. The back cover comprises a panel that conceals the appliance mounting hardware when it is engaged in fully assembled form with the receptacles on the mounting plate. The back cover also comprises a lower securing element for engagement with the platform. The platform generally comprises an upper housing and a lower housing. The fasteners cooperate with the upper housing to secure the mounting plate and back cover to the platform. In addition, the lower housing includes a locking mechanism. The locking mechanism secures the upper and lower housings and as a result conceals the fasteners.

In one embodiment, the platform of the security mounting apparatus may further comprise a platform cover. In another embodiment, the security mounting apparatus may comprise a front cover. In another embodiment, the front cover may be fused to the base of the mounting plate.

In assembled form, the present invention provides an aesthetically pleasing security apparatus for flat panel screens. The mounting hardware and locking mechanism of the security device of the present invention are generally concealed and inaccessible. However, a trained user may easily unlock and disassemble the device.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Figure 1:
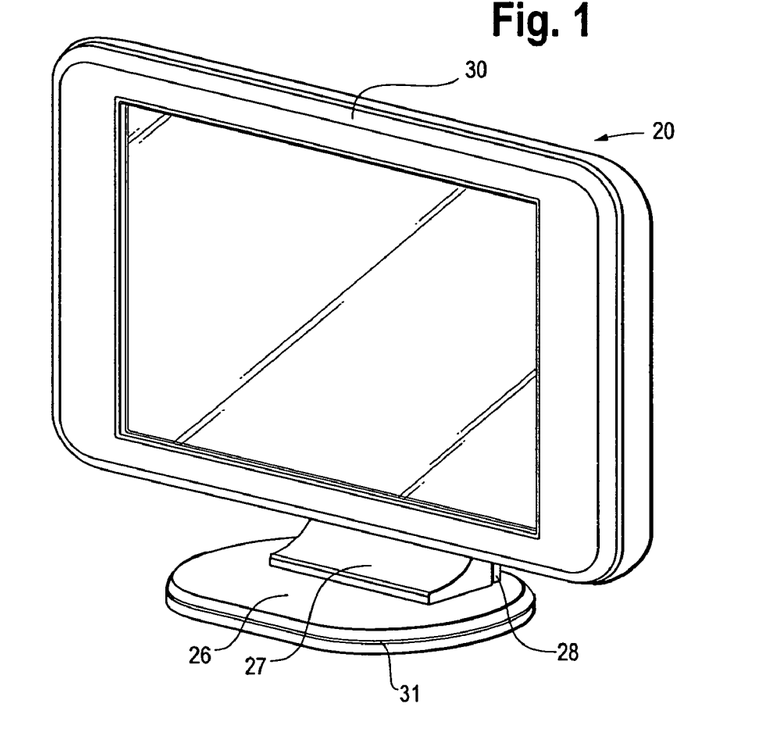
FIG. 1 is a front view of an assembled security mounting apparatus.
Figure 2:
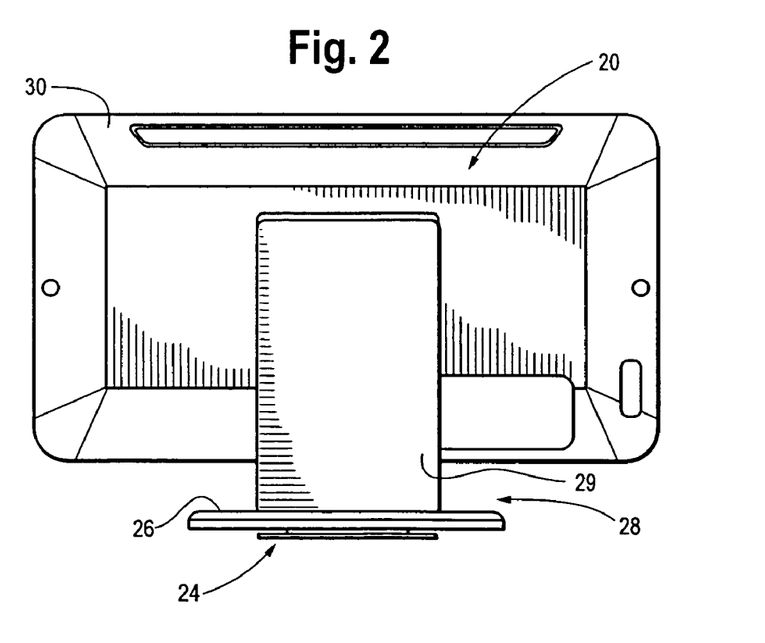
FIG. 2 is a back view of an assembled security mounting apparatus.
Figure 3:
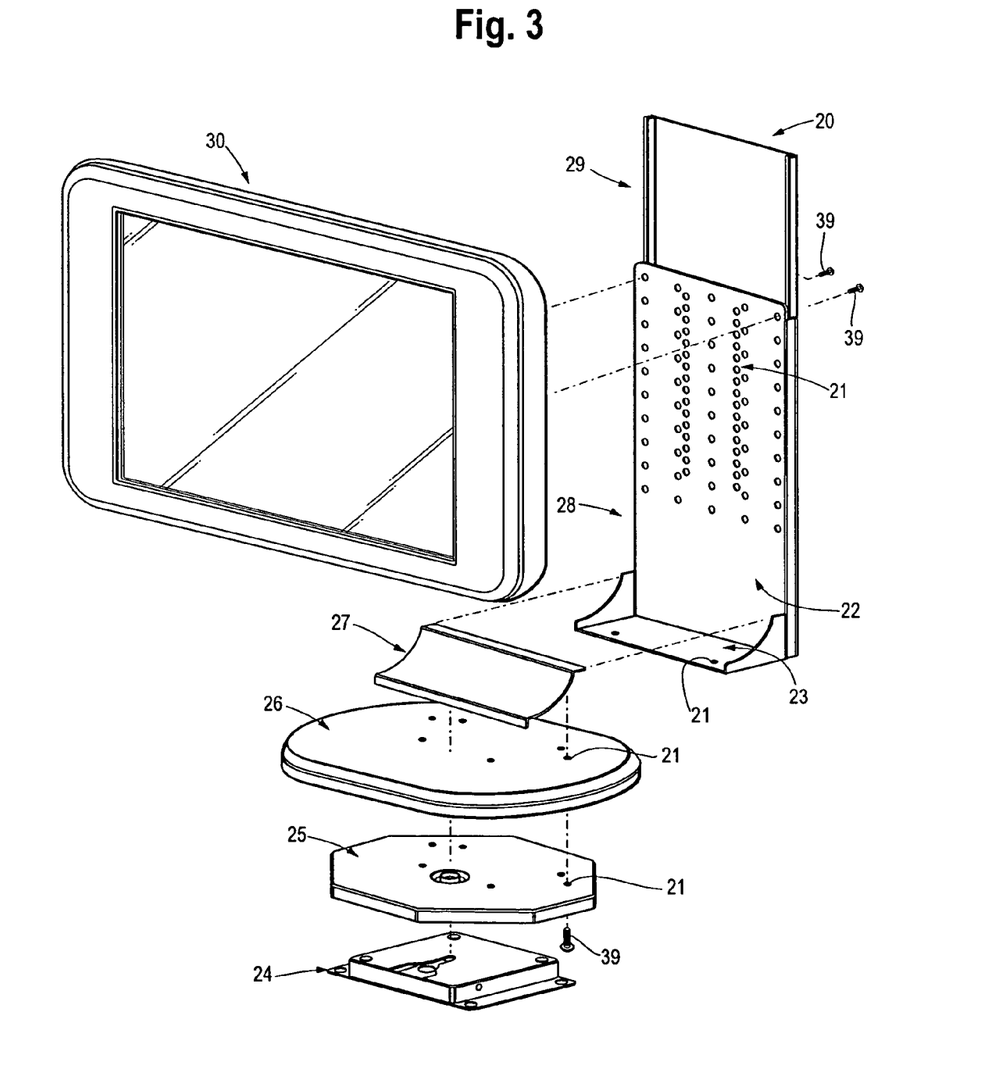
FIG. 3 shows the individual components of a security mounting apparatus.

An assembled security mounting apparatus 20 is shown in FIGS. 1 and 2. FIG. 3 shows the individual components of the apparatus. These components include a mounting plate 28 for mounting video display appliance 30, a back cover 29 for concealing the mounting hardware on mounting plate 28, and a platform for rotationally securing the mounting plate and back cover to a surface. The platform generally comprises a lower housing 24 that serves as a locking mechanism, and an upper housing 25 that serves as a support surface. The platform may further comprise a platform cover 26 for enhancing the aesthetics of the mounting apparatus. As it will become apparent, the individual components of security mounting apparatus 20 are connected to one another by a plurality of super-imposable apertures 21 that receive a plurality of fasteners 39.

Turning again to FIG. 3, the security mounting apparatus 20 of the present invention may further comprise a front cover 27 for concealing the mounting hardware on base 23 of mounting plate 28. In the preferred embodiment of the present invention, front cover 27 is permanently fused to base 23 of mounting plate 28. Such fusion provides extra security measures.

Figure 4:
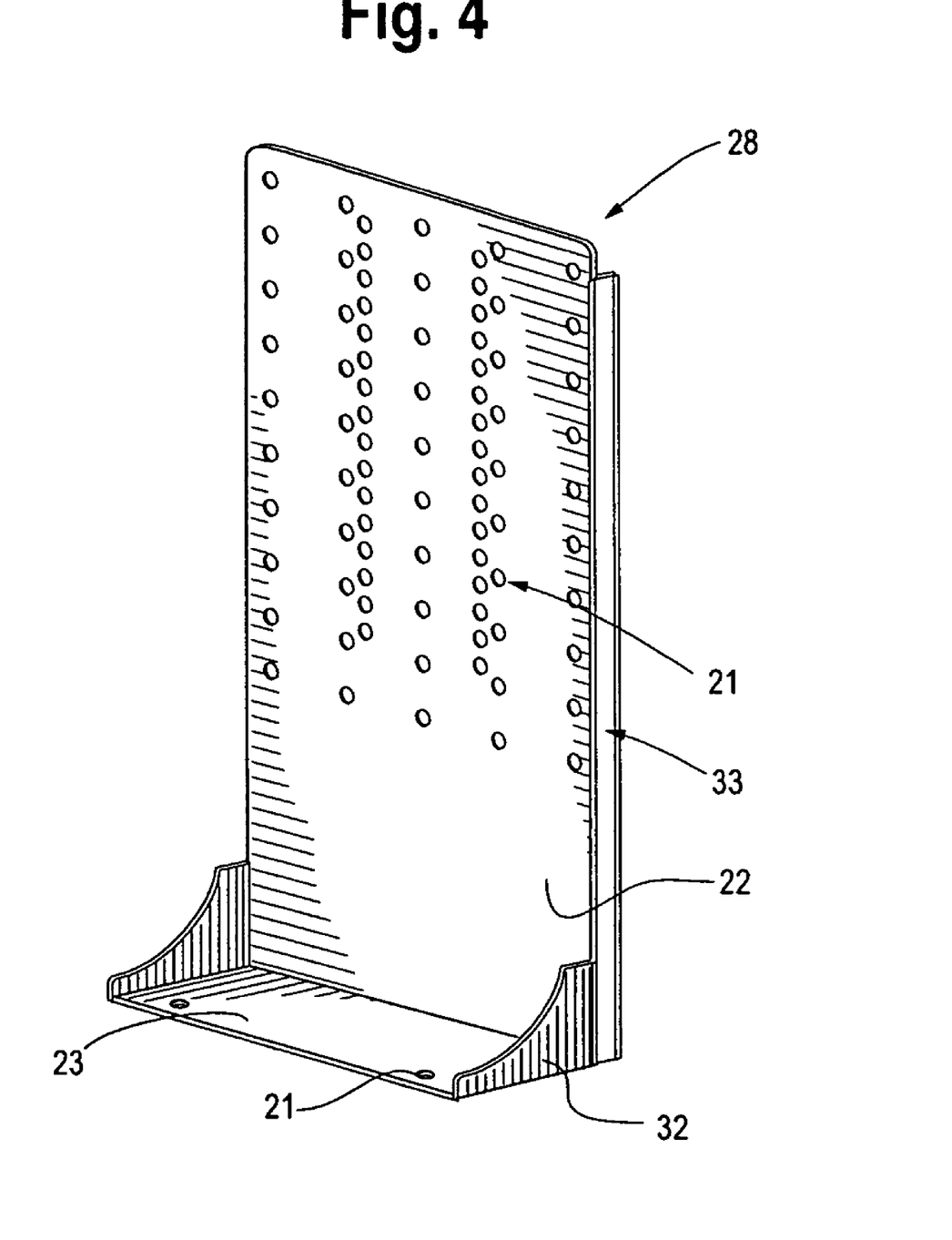
FIG. 4 shows a front view of a mounting plate.
Figure 5:
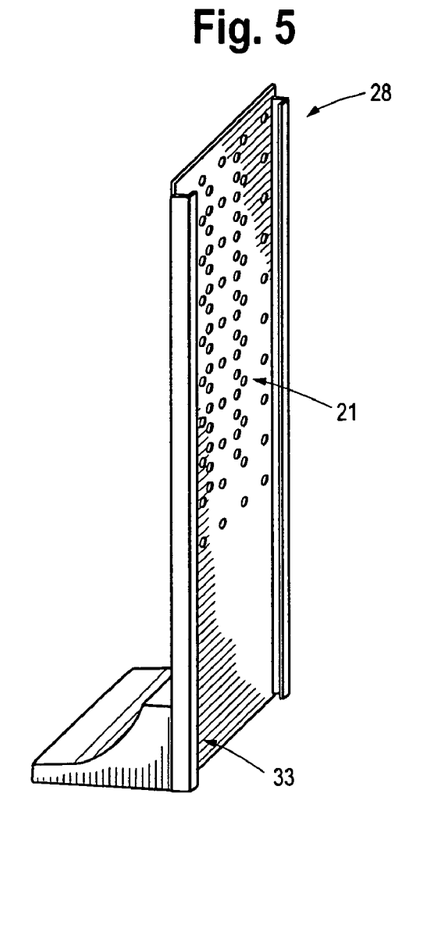
FIG. 5 shows a side view of a mounting plate.

Turning now to FIGS. 4-5, detailed illustrations of mounting plate 28 are shown. Mounting plate 28 preferably comprises an array of apertures 21 on its surface 22 for mounting video display appliance 30 at a desirable height. Mounting plate 28 further comprises base 23 with a plurality of apertures 21 for attachment to the platform. In addition, mounting plate 28 contains receptacles 33 for receiving back cover 29. Receptacles 33 may be frames, racks, channels, Velcro flaps, or other suitable structures. It is also desirable that mounting plate 28 comprise sides 32 for substantially concealing the mounting hardware on base 23 and receiving front cover 27.

Figure 6:
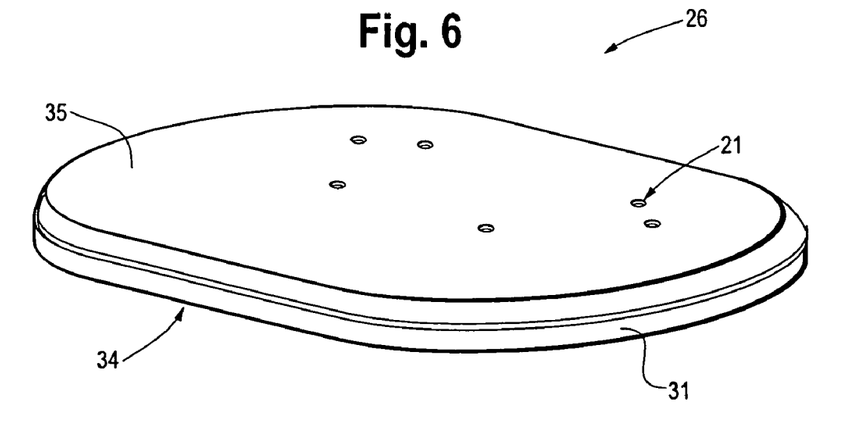
FIG. 6 shows a front view of a platform cover.

Referring now to FIG. 6, a more detailed illustration of platform cover 26 is shown. Platform cover 26 is preferably oval in structure and comprises a plurality of apertures 21. It is desirable that platform cover 26 further comprise a side cover 31 for substantially concealing the upper and lower housings.

Figures 7, 7A:
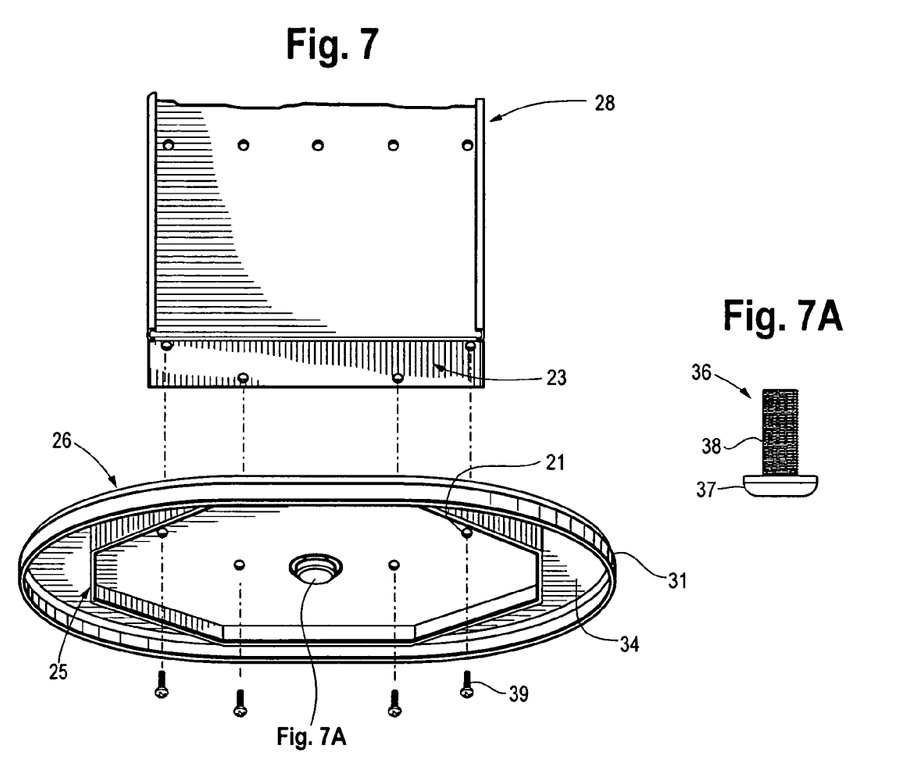
FIG. 7 shows the attachment of a mounting plate to a platform.
Figure 8:
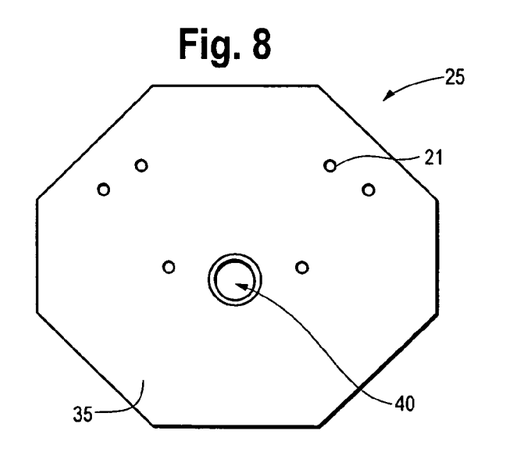
FIG. 8 shows a planar view of an upper housing.

Turning now to FIGS. 7 and 8, more detailed illustrations of upper housing 25 are shown. Upper housing 25 is preferably a hexagonal structure with a plurality of apertures 21. Upper housing 25 further comprises a central aperture 40 for receiving stud 36. As it will become apparent, stud 36 may be used to connect upper housing 25 to lower housing 24.

Figures 9, 10:
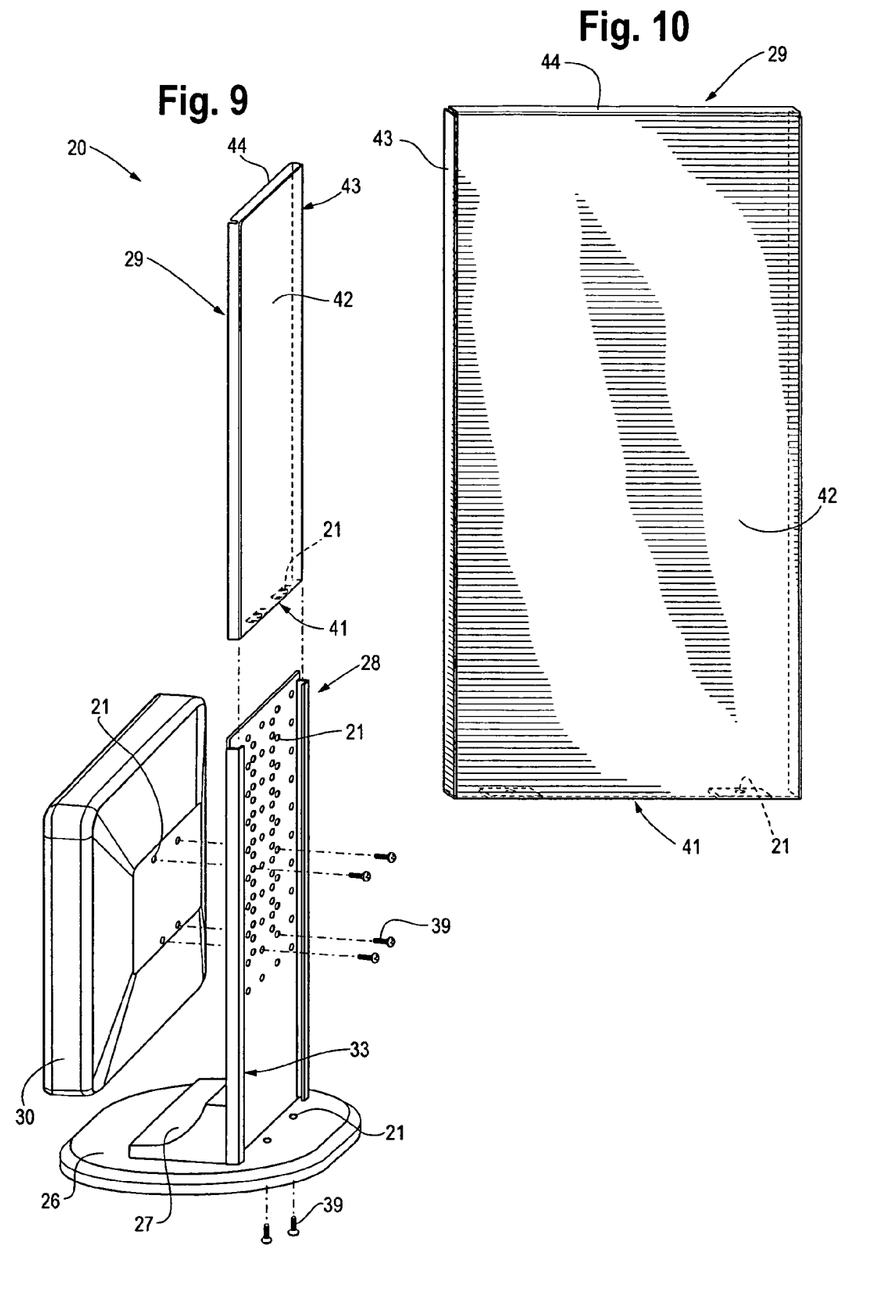
FIG. 9 shows the attachment of a front cover and flat panel screen onto a mounting plate.
FIG. 10 shows a back cover.

Turning now to FIGS. 9 and 10, more detailed illustrations of back cover 29 are shown. Back cover 29 is preferably a rectangular structure with a slightly smaller area than mounting plate 28. Back cover 29 comprises a panel 42 for concealing the mounting hardware on mounting plate 28. Back cover 29 further comprises a lower securing element 41 with a plurality of apertures 21 for attachment to the platform. It is also desirable that back cover 29 comprise sides 43 and top cover 44 for further concealment of the mounting hardware.

Turning again to FIG. 3, a preferred method of assembling the apparatus of the present invention is illustrated. First, upper housing 25 and platform cover 26 are connected to mounting plate 28. Next, mounting plate 28 is connected to video display appliance 30. Back cover 29 is then placed on the back surface of mounting plate 28 and connected to the platform. Finally, lower housing 24 is attached to a desired surface, and the assembled apparatus is fastened to it.

A preferred method of connecting mounting plate 28 to the platform is shown in FIG. 7. In the preferred method, upper housing 25 is mounted onto the bottom surface 34 of platform cover 26 in such a way that the super-imposable apertures 21 on each surface align. Mounting plate 28 is then placed on the top surface of platform cover 26 in the same manner. Next, fasteners 39 are inserted into the aligned apertures 21 from the bottom surface of upper housing 25. Fasteners used in the present invention may be screws, nails or other suitable structures.

It must be noted that platform cover 26 is an optional feature of the present invention. Hence, in another embodiment of the present invention, mounting plate 28 and back cover 29 may be directly connected to upper housing 25.

FIG. 9 shows the next steps in the assembly of security mounting apparatus 20. In the first step, apertures 21 on video display appliance 30 are aligned with several apertures 21 on mounting plate 28 at a desirable height. Fasteners 39 are then inserted into the aligned apertures. Next, back cover 29 is inserted into receptacles 33 behind mounting plate 28 such that apertures 21 on the lower securing element 41 are aligned with several apertures on the platform. Several fasteners 39 are then inserted into the aligned apertures from the bottom surface of upper housing 25.

Figure 11:
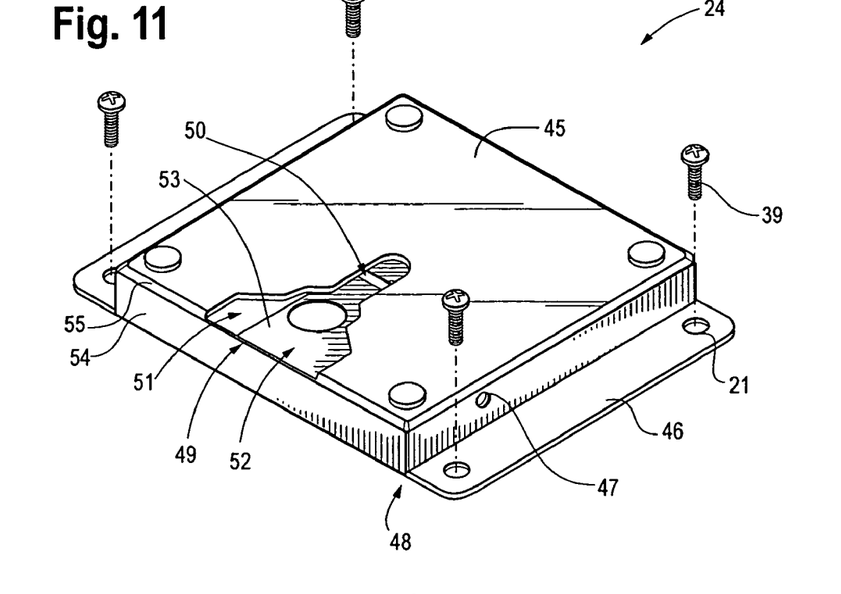
FIG. 11 shows a front view of a lower housing.
Figure 12:
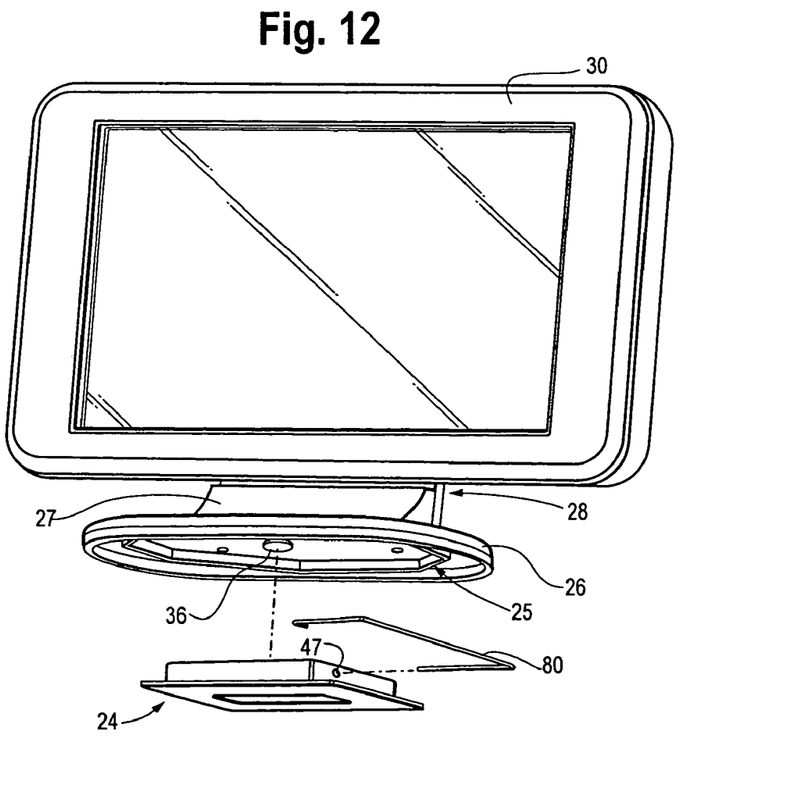
FIG. 12 shows the attachment of the assembled security mounting apparatus onto a lower housing.
Figure 13:
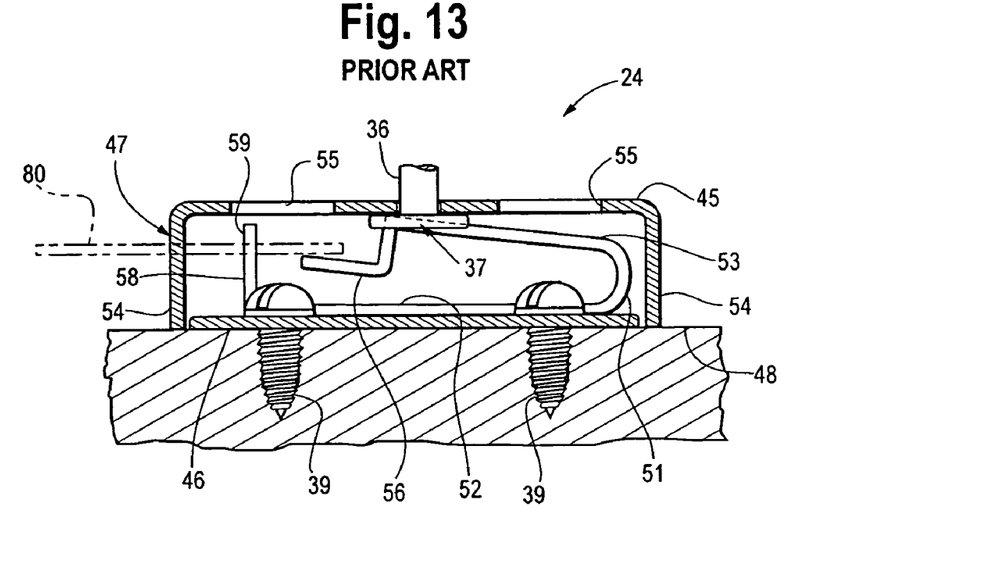
FIG. 13 shows a cross-sectional view of a lower housing in locked form.

The final steps of assembly are illustrated in FIGS. 11-13. As shown in FIG. 11, lower housing 24 is first immobilized onto a desired surface 48. Next, as illustrated in FIG. 12, stud 36 on the bottom surface of upper housing 25 is inserted into lower housing 24. The attachment is illustrated in more detail in FIG. 13.

Turning again to FIG. 11, lower housing 24 is preferably a box with a base plate 46, a cover plate 45, a top surface 55, and multiple side walls 54. Base plate 46 may contain several apertures 21 for immobilizing lower housing 24 to a desired surface 48 by fasteners 39. Alternatively, base plate 46 may be attached to a desirable surface by other means, such as double-sided adhesive tapes.

The box in lower housing 24 houses a locking means 53. Locking means 53 is preferably a metal object with substantial spring force that is in contact with top surface 55. Locking means 53 is accessible through an aperture 49. Aperture 49 further comprises a larger portion 51 and a slotted portion 50. Further information on lower housing 24 is disclosed in U.S. Pat. No. 4,973,023 and incorporated herein by reference.

Attachment of security mounting apparatus 20 to lower housing 24 is illustrated in FIGS. 12 and 13. Attachment occurs when stud 36 on upper housing 25 is inserted into larger portion 51 of aperture 49. The apparatus is then pressed downward on locking means 53 and slid into slotted portion 50. Since slotted portion 50 is narrower than stud head 37, stud 36 is fastened to lower housing 24 through the spring force of locking means 53 such that stud 36 remains rotationally free. Such an attachment is illustrated in more detail in U.S. Pat. No. 4,973,023 and herein incorporated by reference.

As shown in FIGS. 1 and 2, the assembled structure provides an aesthetically pleasing and rotationally free structure. More importantly, the mounting and security hardware in this structure are concealed from and inaccessible to the general user. In particular, the attachment site of lower housing 24 to upper housing 25 is substantially concealed, especially if platform cover 26 is included. Likewise, the fasteners 39 that connect video display appliance 30 to mounting plate 28 are covered and made inaccessible by back cover 29. In addition, front cover 27 conceals the hardware on base 23 of mounting plate 28.

Figure 14:
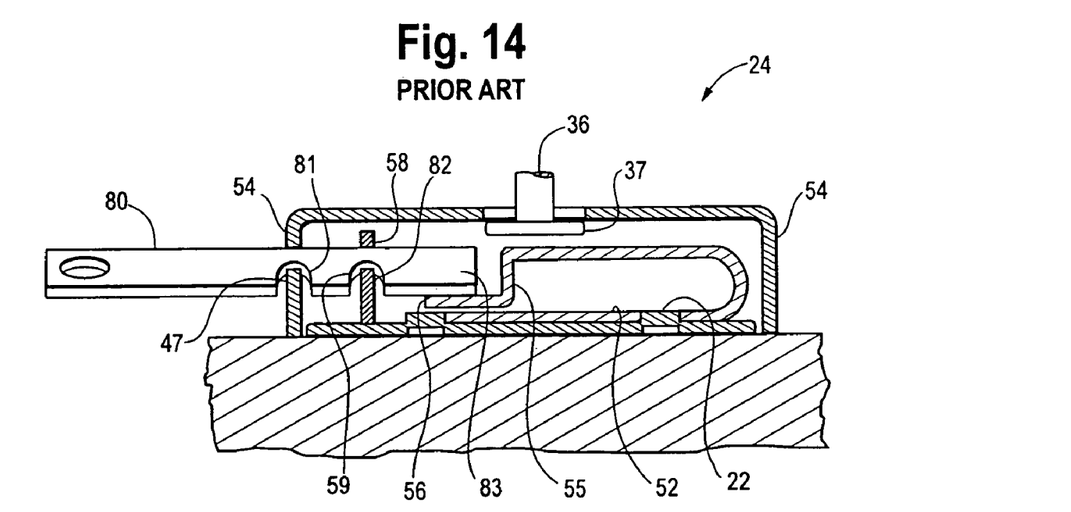
FIG. 14 shows a cross-sectional view of a lower housing in unlocked form.

The nature of the security mounting apparatus of the present invention makes it difficult for the general user to detach and steal the mounted video display appliance. However, a trained user may use a release member 80 for detachment. As shown in FIG. 12, release member 80 may be inserted into aperture 47. Next, as shown in FIG. 13, release member 80 can be aligned with ledge 56 on locking means 53. Release member 80 is then rotated to lower locking means 53 to release stud 36 from top surface 55. Subsequently, as shown in FIG. 14, stud 36 may be slid out from slotted portion 50 onto larger portion 51 and lifted to release the apparatus from lower housing 24. A more detailed illustration of this detachment method is disclosed in U.S. Pat. No. 4,973,023 and herein incorporated by reference. In the present invention, release member 80 may be a key, rod, or other suitable mechanical structure.

In the preferred embodiment of the present invention, front cover 27, back cover 29, mounting plate 28, upper housing 25, and lower housing 24 are comprised of a polished 14 gauge steel product. On the other hand, platform cover 26 is preferably comprised of an ornamental plastic product. Such a combination provides a durable and rigid security device that is also aesthetically pleasing. In other embodiments, the individual components of mounting apparatus 20 could be composed of other forms of steel or plastic. The individual components could also be composed of metal or wood.

The apparatus of the present invention may be used in various places to prevent the theft of planar video display appliances. Examples of such places include hotels, libraries, schools, airports, residences, or offices. Appliances that could be mounted onto the security mounting apparatus of the present invention include flat panel televisions (e.g., plasma or high definition TV's) and computer monitors.

It will be evident that many variations of security mounting apparatus 20 are within the scope of the present invention, even though they were not expressly described in the specification. The above description is therefore intended to be exemplary only and the scope of the invention is to be determined solely by the appended claims.

The invention claimed is:

1. A low profile security mounting apparatus for mounting a generally planar video display appliance to a support surface, comprising:
   a. a mounting plate having (i) an array of apertures to receive hardware for mounting the video display appliance directly to one surface of said plate, (ii) a base attached to said mounting plate and having apertures for securing said mounting plate to a platform using said apertures, and (iii) a receptacle configured for engagement with a back cover;
   b. said back cover having (i) a panel configured to conceal the appliance mounting hardware when the back cover is engaged with said receptacle and fully assembled to the mounting plate, and (ii) a lower securing element including apertures;
   c. said platform having an upper housing and a lower housing;
   d. a plurality of fasteners cooperating with the upper housing to secure said base of said mounting plate to the platform through said apertures and to secure said back cover through said apertures of said lower securing element to the platform; and
   e. wherein said lower housing includes a low profile locking mechanism to secure the upper and lower housings in assembled relation and to thereby conceal said plurality of fasteners.

2. The security mounting apparatus of claim 1, wherein the platform further comprises a platform cover.

3. The security mounting apparatus of claim 1 further comprising a front cover.

4. The security apparatus of claim 3, wherein the front cover is fined to the mounting plate.

* * * * *

UNITED STATES PATENT AND TRADEMARK OFFICE
CERTIFICATE OF CORRECTION

PATENT NO. : 7,611,118 B2 Page 1 of 1
APPLICATION NO. : 11/351203
DATED : November 3, 2009
INVENTOR(S) : Edward L. O'Neill It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Twelfth Day of October, 2010

David J. Kappos
*Director of the United States Patent and Trademark Office*